United States Patent [19]

Matsuda

[11] Patent Number: 4,756,203
[45] Date of Patent: Jul. 12, 1988

[54] INTERMITTENT DRIVE MECHANISM
[75] Inventor: Yasuhiko Matsuda, Kurobe, Japan
[73] Assignee: Yoshida Kogyo K. K., Tokyo, Japan
[21] Appl. No.: 78,651
[22] Filed: Jul. 28, 1987
[30] Foreign Application Priority Data Jul. 28, 1986 [JP] Japan ................... 61-176895

[51] Int. Cl.⁴ ............... F16H 27/04; F16H 35/02
[52] U.S. Cl. .................... 74/84 R; 74/393;
74/437; 74/640
[58] Field of Search ........... 74/84 R, 437, 640, 393,
74/116, 118

[56] References Cited
U.S. PATENT DOCUMENTS

| | | | |
|---|---|---|---|
| 1,449,845 | 3/1923 | Taylor | 74/437 |
| 2,700,285 | 1/1955 | Bellini | 74/437 X |
| 2,861,635 | 11/1958 | Orr | 74/393 X |
| 3,424,021 | 1/1969 | Freudenstein | 74/84 R |
| 3,435,790 | 4/1969 | Hale | 112/214 |
| 3,613,470 | 10/1971 | Arakawa | 74/393 |
| 4,012,964 | 3/1977 | Lee | 74/435 |

Primary Examiner—Allan D. Herrmann
Attorney, Agent, or Firm—Hill, Van Santen, Steadman & Simpson

[57] ABSTRACT

An intermittent drive mechanism includes a pair of non-circular drive and driven gears for translating a constant velocity rotary motion of an input shaft into a non-uniform velocity rotary motion of an intermediate shaft, the latter-mentioned rotary motion having a sinusoidal angular speed pattern, and a harmonic speed reducer drivingly connecting the intermediate shaft to an output shaft which is connected to a flexible spline of the speed reduce. A rigid circular spline of the speed reducer is angularly reciprocated under the control of an eccentric cam on the input shaft in such a manner that the motion of the sinusoidal angular speed pattern is transmitted from the intermediate shaft to the output shaft in a certain decelerated condition only while the intermediate shaft turns through a half of each turn. The motion transmission takes place gently without causing undesired shock at the beginning and the end of the motion.

5 Claims, 6 Drawing Sheets

ANGLE OF ROTATION OF INTERMEDIATE SHAFT

ANGLE OF ROTATION OF INTERMEDIATE SHAFT

ANGLE OF ROTATION OF OUTPUT SHAFT

INTERMITTENT DRIVE MECHANISM

BACKGROUND OF THE INVENTION

1. Field of the Invention:

The present invention relates to an intermittent drive mechanism for use in an intermittently operative apparatus, such as an apparatus for intermittently feeding a tape-like flexible elongate material by and between a cooperative pair of feed and presser rollers.

2. Prior Art:

There are known various intermittent feed mechanisms of the type described. One such known mechanism is shown in FIG. 10, which mechanism comprises a gear ratchet including a drive pawl 101 pivoted to one end of a lever 102 and meshing with a toothed ratchet wheel 103 fixed on a drive shaft 104, the other end of the lever 102 being slidably fitted over an eccentric cam 105 connected with a driven shaft 106. Upon rotation of the drive shaft 104, the drive pawl 101 moves back and forth in the directions of the arrowheads A to thereby turn the ratchet wheel 103 and hence the driven shaft 106 stepwise in the counterclockwise direction. The drive mechanism further includes a friction brake unit composed of a brake drum 107 secured to the drive shaft 106, a pair of brake shoes 108, 109 secured to confronting inner edges of a pair of brake levers 110, 111 disposed on opposite sides of the brake drum 107, and a spring 112 acting between the brake shoes 108, 109 to urge them toward each other into frictional engagement with the brake drum 107.

The known intermittent drive mechanism thus constructed is disadvantageous in that it cannot precisely control the stepwise angular motion of the driven shaft 106 bacause the stopping timing of the stepwise motion is solely dependent on a friction or braking force exerted by the friction brake unit. The ratchet wheel 103 is likely to overrun while it is driven at a high speed. Furthermore, the contacting components, particularly the brake shoes 108, 109 and the drive pawl 101 are progressively worn out while in use, and hence a frequent adjustment or maintenance of such components is required. Another drawback is that the components in the drive mechanism themselves and other components driven by the drive mechanism are likely to be damaged due to undue shock forces applied thereto when the stepwise movement of the driven shaft 106 is started and stopped abruptly in such a manner that the angular speed of the drive shaft varies in a rectangular pulse-like fashion, as shown in FIG. 11.

Other prior art mechanisms are not satisfactory because they also have the foregoing drawbacks in greater or lesser degree.

SUMMARY OF THE INVENTION

It is accordingly an object of the present invention to provide an intermittent drive mechanism which produces an accurately controlled stepwise driving motion without undue shock forces at the beginning and the end of the stepwise motion and which is relatively unsusceptible to abrasive wear and hence easy to maintain.

According to the present invention, an intermittent drive mechanism includes a non-circular drive gear secured to an input shaft rotating at a constant speed, a non-circular driven gear fixedly mounted on an intermediate shaft and held in driven mesh with the drive gear, and a speed reducer drivingly connecting the intermediate shaft to an output shaft. The speed reducer includes an elliptical cam fixedly connected with the intermediate shaft, an externally toothed flexible spline slidably fitted over the elliptical cam and firmly connected with the output shaft, and an internally toothed rigid circular spline rotatable relatively to the intermediate shaft. The flexible spline has teeth less in number than teeth on the rigid circular spline and meshes with the rigid circular spline at two diametrically opposite regions extending along a major axis of the elliptical cam. A crank lever operatively connects an eccentric cam on the input shaft with the rigid circular spline so as to transmit a reciprocating rotary motion to the rigid circular spline.

With this construction, a constant velocity rotary motion of the input shaft is translated through the non-circular drive and driven gears into a non-uniform velocity rotary motion of the intermediate shaft, the latter mentioned rotary motion having a reduced angular speed of simusoidal pattern.

As the elliptical cam rotates, major and minor axes of the flexible spline correspondingly rotate along with the regions of contact and clearance between the teeth on the flexible and rigid splines. Because the number of teeth on the flexible spline is less than the number of teeth on the rigid circular spline, when the elliptical cam rotates one turn, the flexible spline will turn in a direction opposite that of the elliptical cam through an angle which corresponds to the difference in number between the teeth on the rigid circular spline and the teeth on the flexible spline. Therefore, the flexible spline rotates one turn only when the elliptical cam has completed a number of turns which correspond to a value obtained by dividing the number of teeth of the rigid circular spline by the number of aforesaid teeth of difference. Now, when the rigid circular spline is turned through one half of the foregoing angle in the same direction as the elleptical cam while the elleptical cam moves through a first half of a single turn, the flexible spline will remain immovable or non-rotatable relatively to the elliptical cam. Then when the rigid circular spline is turned through the same angle as it has just done before, but in the opposite direction as the elliptical cam during the next succeeding half-turn of the intermediate shaft, the flexible spline will turn through the aforesaid angle with respect to the elliptical cam.

The foregoing reciprocating angular movement of the rigid circular spline is controlled by the eccentric cam. The eccentric cam is connected with the rigid circular spline via the crank lever such that for each turn of the intermediate shaft, one-half of the reduced, non-uniform velocity rotary motion of a sinusoidal pattern is transmitted from the intermediate shaft to the output shaft to turn the latter, whereas the rest of the rotary motion of the intermediate shaft is not transmitted to the output shaft. Consequently, the output shaft turns stepwise in one direction. The stepwise movement of the output shaft takes place gently without causing undesired shock because both of the pair of non-circular drive and driven gears and the pair of flexible and rigid splines are continuously meshing with each other. Furthermore, as the speed reduction is achieved by the gear trains, the starting and stopping timing of the intermittent rotary motion can accurately be controlled. The gear trains are relatively unsusceptible to abrasive wear and hence easy to maintain.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
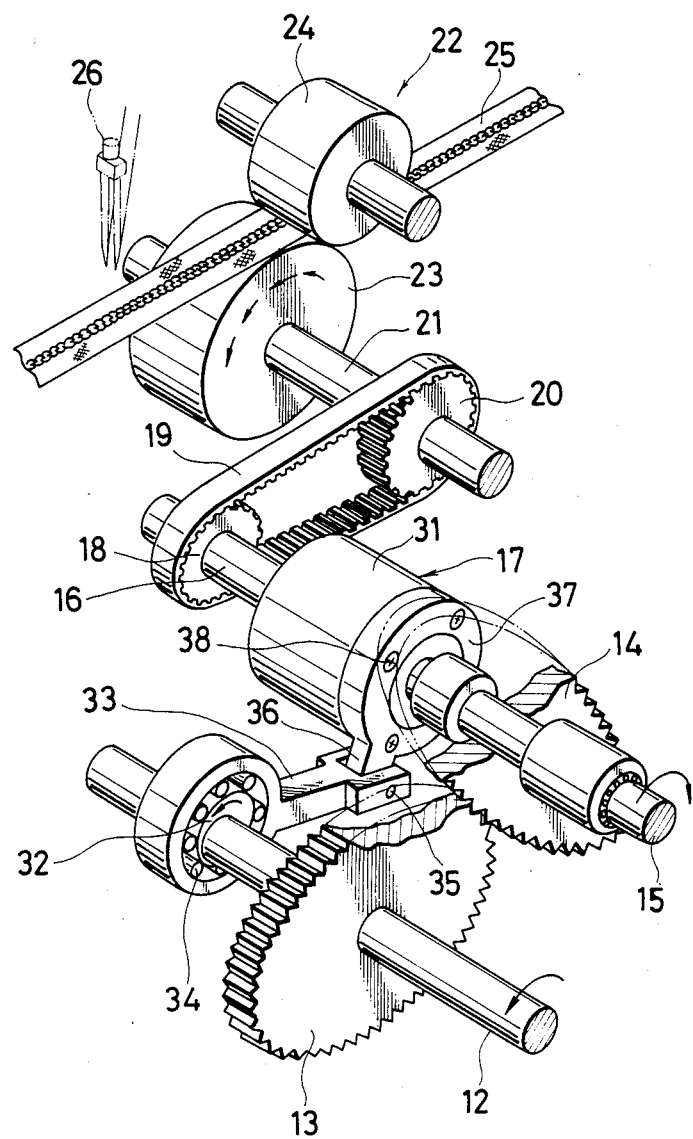
FIG. 1 is a fragmentary perspective view of an intermittent drive mechanism embodying the present invention.
Figure 2:
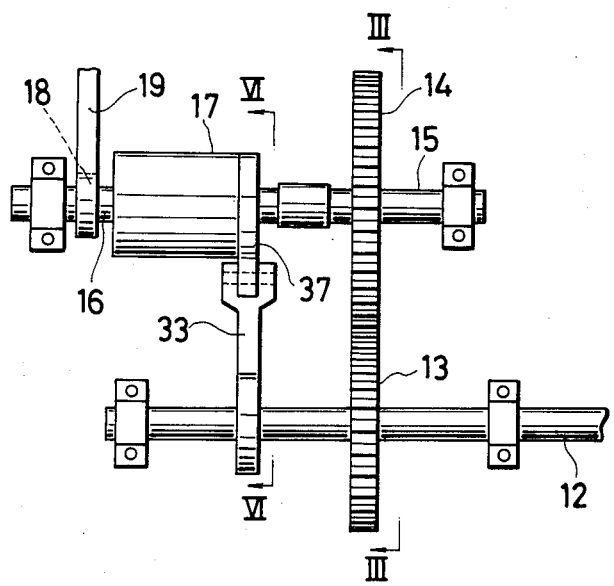
FIG. 2 is a schematic plan view of the mechanism shown in FIG. 1.
Figure 3:
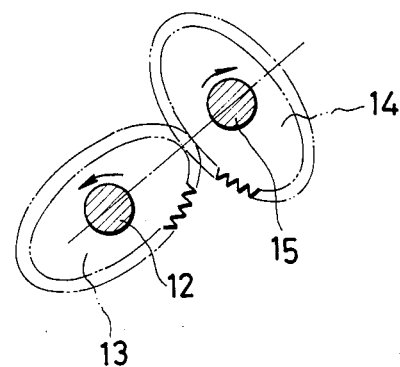
FIG. 3 is a cross-sectional view taken along line III—III of FIG. 2, showing non-circular drive and driven gears of the mechanism.

As shown in FIG. 1, an intermittent drive mechanism embodying the present invention is particularly useful when incorporated in a sewing unit in a slide fastener manufacturing apparatus. In this figure, a frame, bearing members and a drive motor of the intermittent drive mechanism are omitted for clarity.

Figure 7:
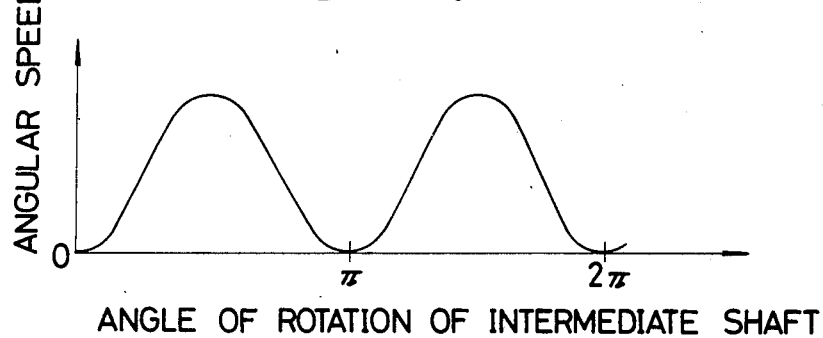
FIG. 7 is a graph showing a pattern of the angular speed of an intermediate shaft obtained by the non-circular drive and driven gears of the mechanism.

The intermittent drive mechanism comprises an input shaft 12 driven by the drive motor to rotate at a constant velocity and supporting thereon a non-circular drive gear 13 for corotation therewith. The drive gear 13 is held in driving mesh with a non-circular driven gear 14 fixedly connected with an intermediate shaft 15 extending parallel to the input shaft 12. The non-circular drive and driven gears 13, 14 have an elliptical shape and they serve to translate a constant velocity rotary motion of the input shaft 12 into a non-uniform velocity rotary motion of the intermediate shaft 15. The rotary motion of the intermediate shaft 15 has an angular velocity varying in a sinusoidal pattern, as shown in FIG. 7.

The intermediate shaft 15 is operatively connected with an output shaft 16 through a speed reducer 17. The output shaft 16 carries thereon a toothed drive pulley 18 connected by a synchronous belt 19 with a toothed driven pulley 20. The driven pulley 20 is fixedly mounted on a drive shaft 21 of a feed unit 22. The feed unit 22 includes a feed roller 23 secured to the drive shaft 21, and a presser roller 24 associated with the feed roller 23 for urging a continuous slide fastener chain 25 against the feed roller 23. The feed unit 22 is driven by the present intermittent drive mechanism to feed the slide fastener chain 25 stepwise in a longitudinal direction, in synchronism with the operation of a sewing machine 26.

Figure 4:
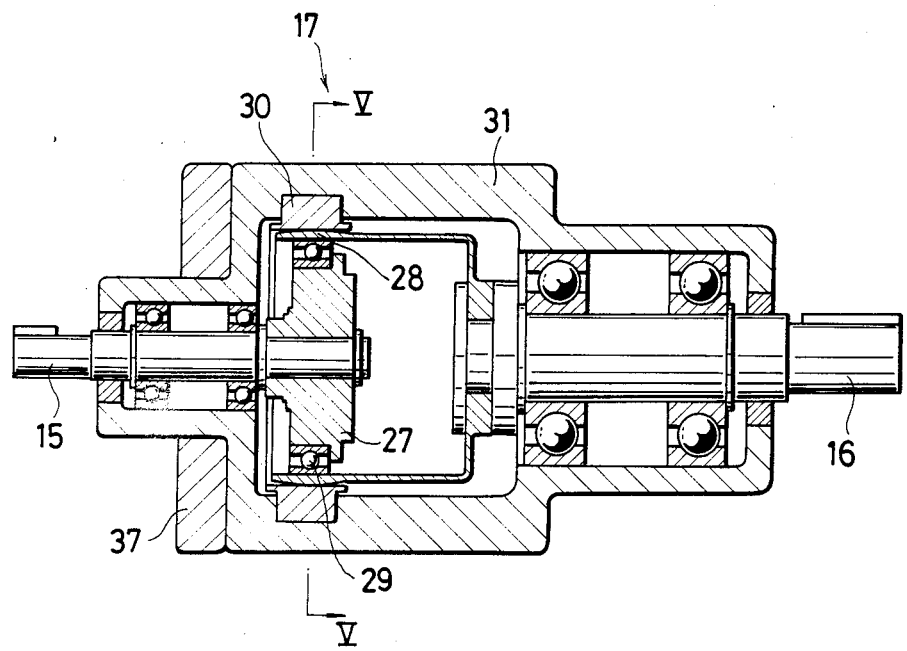
FIG. 4 is an enlarged longitudinal cross-sectional view of a speed reducer of the mechanism.
Figure 5:
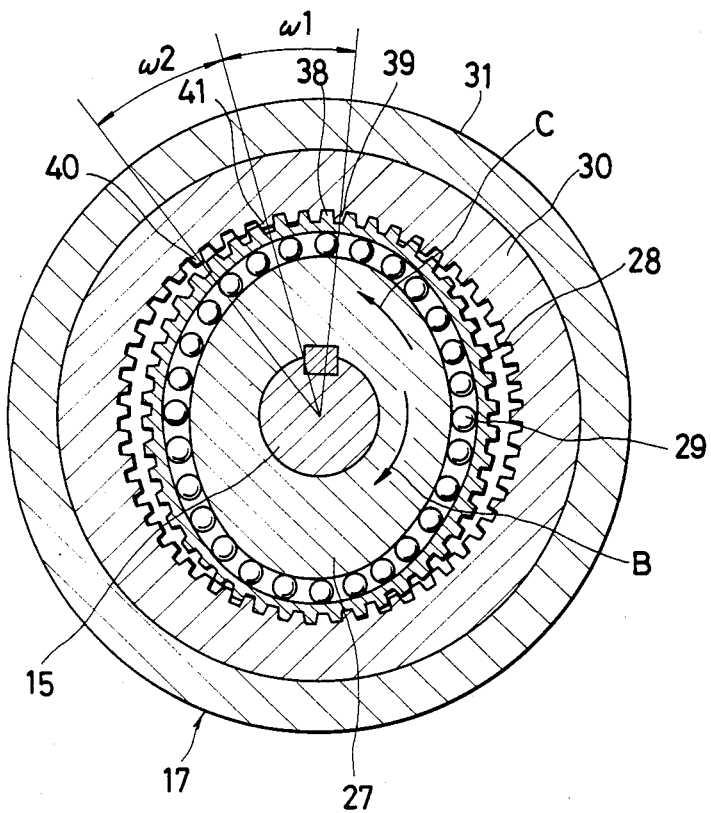
FIG. 5 is an enlarged cross-sectional view taken along line V—V of FIG. 4.

As shown in FIGS. 4 and 5, the speed reducer 17 includes an elliptical cam 27, an externally toothed flexible spline 28 slidably mounted around the elliptical cam 27 via a ball bearing 29, and an internally toothed rigid circular spline 30 held in mesh with the flexible spline 28 at two diametrically opposite regions extending along a major axis of the elliptical cam 27. The flexible spline 28 is formed of a toothed steel belt and has external teeth at least two less in number than the internal teeth on the rigid circular spline 30. In the illustrated embodiment, the flexible spline 28 has 46 external teeth while the rigid circular spline 30 has 52 internal teeth. The elliptical cam 27 is fixedly mounted on the input shaft 15 for corotation therewith. The flexible spline 28 is fixedly connected with the output shaft 16 (FIG. 4) while the rigid circular spline 30 is secured to a hollow cylindrical casing 31 rotatably mounted on the intermediate shaft 15 and the output shaft 16 by means of sets of ball bearings, not designated.

Figure 6:
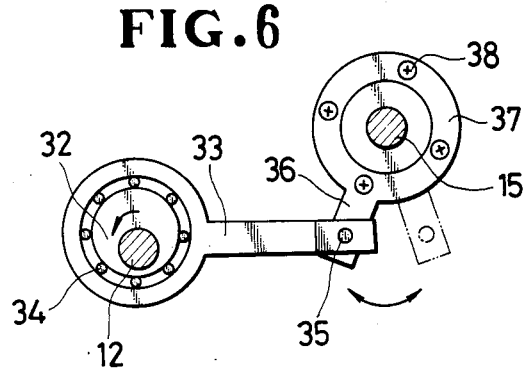
FIG. 6 is a cross-sectional view taken along line VI—VI of FIG. 2, showing a connection between an eccentric cam and an annular bracket of the mechanism.

As shown in FIGS. 1 and 6, the input shaft 12 has fixed thereon an eccentric cam 32 on which a crank lever 33 is mounted via a roller bearing 34. The free end of the crank lever 33 is pivotably connected by a pin 35 with an arm 36 projecting radially outwardly from an annular bracket 37 concentrically secured to the casing 31 by a plurality of screws 38. The eccentric cam 32 has a cam profile designed such that when the input shaft 12 and hence the cam 32 rotates one turn, the casing 31 and therefore the rigid circular spline 30 angularly moves back and forth through an angle $\omega_1$ which is half the angle defined jointly by the number of teeth of difference between the rigid circular spline 30 and the flexible spline 28.

In FIG. 5, as the intermediate shaft 15 and hence the elliptical cam 27 rotates in a direction indicated by the arrow B, the flexible spline 28, while being deformed by the elliptical cam 27 to follow the profile thereof, angularly moves along the rigid circular spline 30 in a direction indicated by the arrow C. Because the number of teeth on the flexible spline 28 is less than the number of teeth on the rigid circular spline 30, when the elliptical cam 27 rotates one turn, the flexible spline 28 will rotate 6/52 parts of a turn in a direction opposite that of the elliptical cam 27. The speed reduction is therefore 6:52 (or 1:8.66). That is to say, one of the teeth 38 on the flexible spline 28, which is meshing with one tooth 39 on the rigid circular spline 30, will mesh with a sixth succeeding tooth 40 on the rigid circular spline 30 when the elliptical cam 27 has rotated one turn.

As described above, the rigid circular spline 30 is reciprocated through the angle $\omega_1$ which is three times as large as the tooth pitch of the rigid circular spline 30, as shown in FIG. 5. The angular reciprocating movement of the rigid circular spline 30 is linked with the rotary motion of the intermediate shaft 15 in the manner as described below. As the intermediate shaft 15 turns to complete a first half of one turn, the rigid circular spline 30 is turned through the angle $\omega_1$ in the same direction (clockwise in FIG. 5) as the intermediate shaft 15 with the result that the flexible spline 28 remains immovable or non-rotatable relatively to the elliptical cam 27 and hence the intermediate shaft 15. In this instance, the tooth 31 on the flexible spline 28 is brought into meshing engagement with a tooth 41 on the rigid circular spline 30. During the next succeeding half-turn of the intermediate shaft 15, the rigid circular spline 30 is turned in the opposite direction (counterclockwise in FIG. 5) through the same angle $\omega_1$. Consequently, the tooth 31 on the flexible spline 28 turns counterclockwise through an angle $\omega_2$, into meshing engagement with the tooth 40 on the rigid circular spline 30. Now, the flexible spline 28 has turned counterclockwise through an angle equal to the sum of $\omega_1$ and $\omega_2$, relatively to the intermediate shaft 15 as the latter has rotated one turn.

Figure 8:
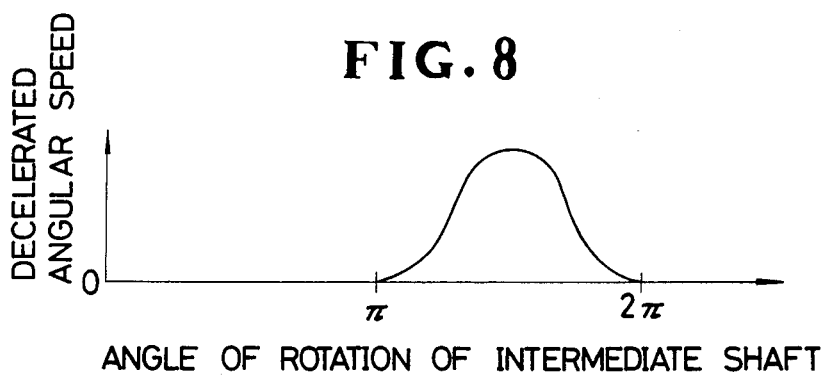
FIG. 8 is a graph illustrative of the speed reduction property of the speed reducer shown in FIGS. 4 and 5.
Figure 9:
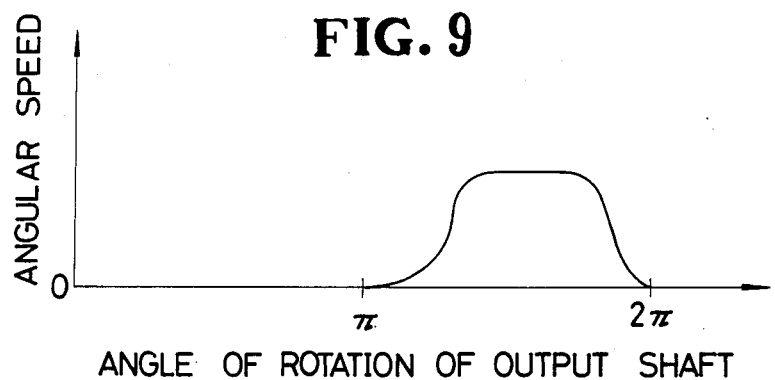
FIG. 9 is a graph showing a pattern of the angular speed of an output shaft of the mechanism shown in FIG. 1.
Figure 10:
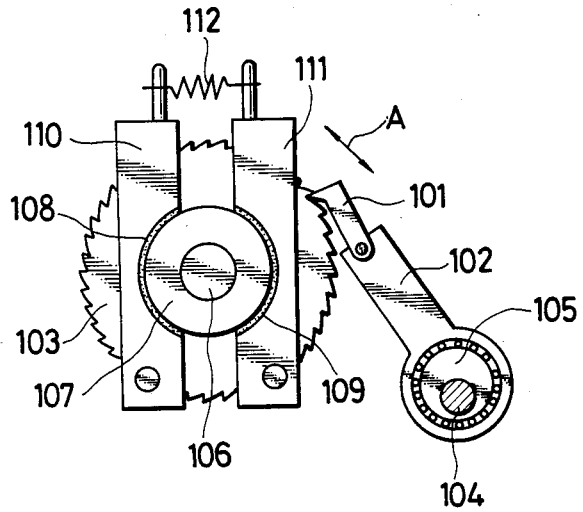
FIG. 10 is a schematic plan view of a prior intermittent drive mechanism.
Figure 11:
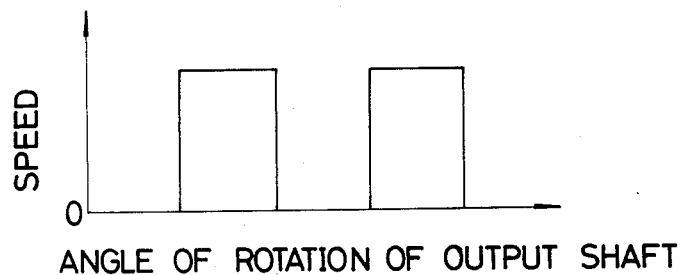
FIG. 11 is a graph showing a pattern of the intermittent motion produced by the mechanism of FIG. 10.

FIG. 8 shows a deceleration or speed-reduction property of the speed reducer 17. The flexible spline 28 remains immovable relatively to the intermediate shaft 15 as the latter turns through a first half of one turn, while it is active to effect speed reduction only when the intermediate shaft 15 is turning through the next succeeding half-turn. Due to rigid connection with the flexible spline 28, the output shaft 16 is also immovable during the first half-turn of the intermediate shaft 15 and is rotated during the second half-turn of the intermediate shaft 15. During the transmission of the rotary motion in the speed reducer 17, the flexible and rigid splines 28, 30 continuously mesh with each other with the result that the rotary motion can be transmitted gently without causing abrupt fluctuation in angular speed at the beginning and the end of the motion. The motion of the decelerated angular speed pattern shown in FIG. 8 is combined with the motion of the sinusoidal angular speed pattern shown in FIG. 7 when the rotary motion of the intermediate shaft 15 is transmitted to the output shaft 16 through the speed reducer 16. With this combination, the output shaft 16 is rotated stepwise in a pattern as shown in FIG. 9. The rotary motion of the output shaft 16 thus obtained takes place gently without causing abrupt fluctuation in angular speed. In the illustrated embodiment, the eccentric cam 32 has a cam profile designed such that the intermittent motion is transmitted to the output shaft 16 when the angular speed of the intermediate shaft 15 becomes maximum. It is possible to modify the cam profile or the relative angular position of the cam 32 and the input shaft 12 to thereby vary the timing of the intermittent rotary motion of the output shaft 16.

As described above, the intermittent drive mechanism of the present invention includes a cooperative pair of non-circular drive and driven gears, and a speed reducer having an internally toothed rigid circular spline and an externally toothed flexible spline meshing with the rigid spline. With this construction, it is possible to accurately control the starting and stopping timing of the intermittent driving motion without causing overruning even when the mechanism is operating at a high speed. Furthermore, due to continuing meshing engagement of the gears and of the splines, the stepwise motion takes place without undesired shock. Consequently, the structural components of the mechanism are free of damage. The gears and splines are relatively unsusceptible to abrasive wear and hence they are easy to maintain.

Obviously, many modifications and variations of the present invention are possible in the light of the above teaching. It is therefore to be understood that within the scope of the appended claims, the invention may be practiced otherwise than as specifically described.

What is claimed is:

1. An intermittent drive mechanism comprising:
   (a) an input shaft rotating at a constant velocity and supporting thereon a non-circular drive gear;
   (b) an intermediate shaft extending parallel with said input shaft and supporting thereon a non-circular driven gear held in driven mesh with said drive gear;
   (c) an output shaft;
   (d) a speed reducer drivingly connecting said intermediate shaft with said output shaft and including
      (i) an elliptical cam fixedly connected with said intermediate shaft,
      (ii) an externally toothed flexible spline slidably fitted over said elliptical cam and firmly connected with said output shaft, and
      (iii) an internally toothed rigid circular spline rotatable relatively to said intermediate shaft, said flexible spline having teeth thereon at least two less in number than teeth on said rigid circular spline and meshing with said rigid circular spline at two diametrically opposite regions extending along a major axis of said elliptical cam;
   (e) an eccentric cam firmly connected with said input shaft for corotation therewith; and
   (f) a crank lever operatively connecting said eccentric cam with said rigid circular spline for transmitting a reciprocating rotary motion to said rigid circular spline.

2. An intermittent drive mechanism according to claim 1, said non-circular drive and driven gears having an elliptical shape and translating a constant velocity rotary motion of said input shaft into a non-uniform velocity rotary motion of said intermediate shaft, the last-mentioned rotary motion having a sinusoidal angular speed pattern, said cam being linked with said rigid circular spline such that said rigid circular spline is turned first in the same direction as said elliptical cam through a first angle which is half of a second angle defined by said at least two teeth while said intermediate shaft turns through a first half of one turn, and then in a direction opposite that of said elliptical cam through said first angle during the next succeeding half-turn of said intermediate shaft.

3. An intermittent drive mechanism according to claim 1, said cam having a cam profile designed such that a motion of said intermediate shaft is transmitted to said output shaft through said speed reducer when the angular speed of said intermediate shaft becomes maximum.

4. An intermittent drive mechanism according to claim 1, said speed reducer including a hollow cylindrical casing rotatably mounted on said intermediate shaft and operatively connected with said crank lever, said casing receiving therein said elliptical cam, said flexible spline and said rigid circular spline, said rigid circular spline being secured to said casing.

5. An intermittent drive mechanism according to claim 4, further including an annular bracket secured to said casing for corotation thereof and pivotably connected to said crank lever.

* * * * *